Feb. 1, 1944. C. M. EASON 2,340,415
CENTRIFUGAL CLUTCH
Filed July 27, 1940 4 Sheets-Sheet 2
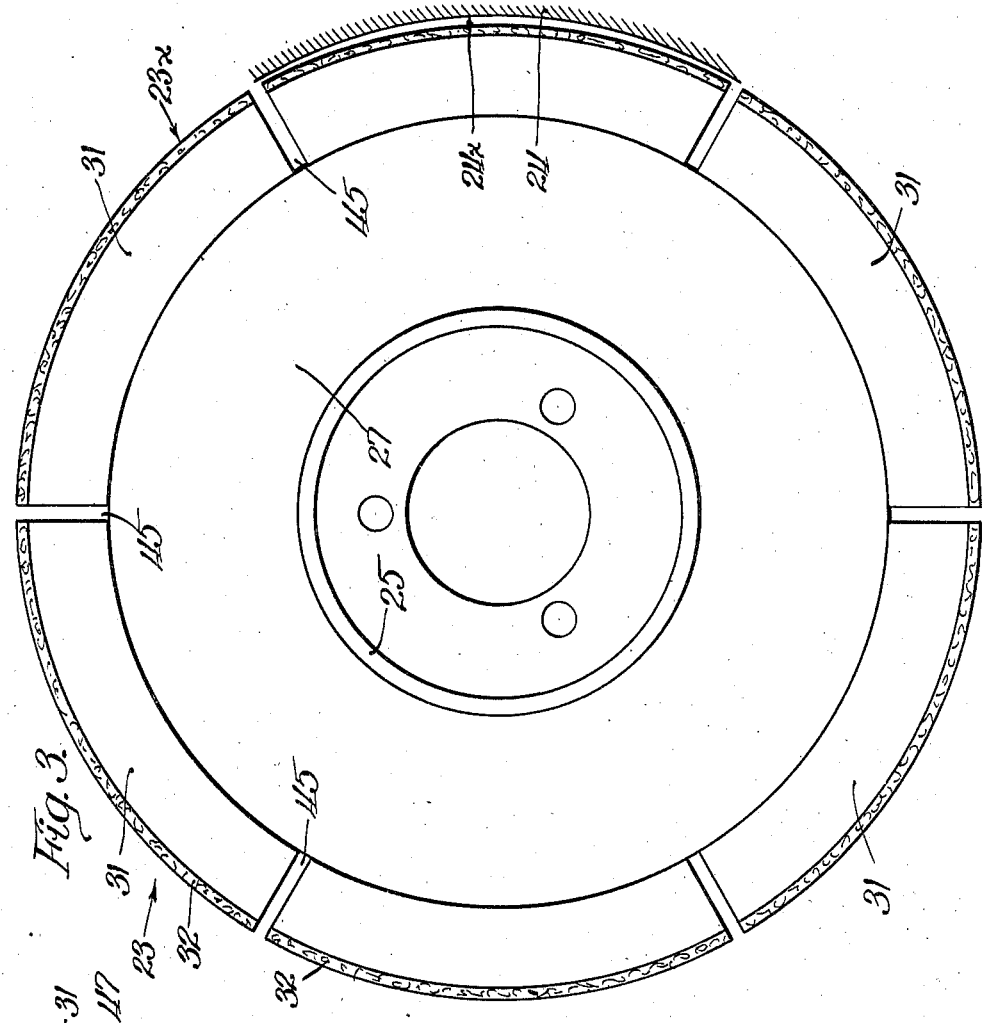
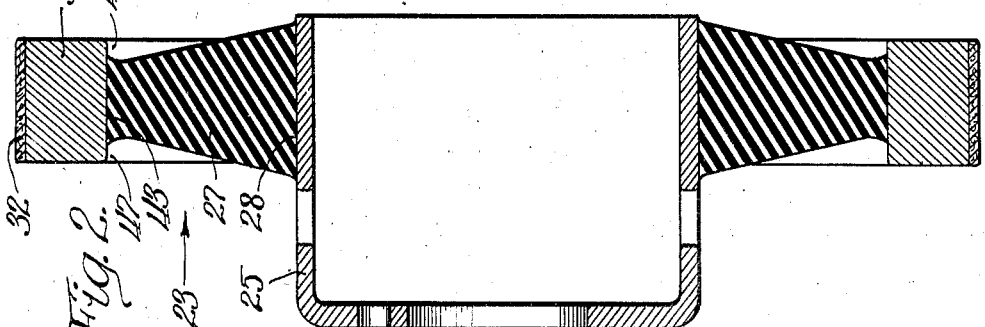
Inventor:
Clarence M. Eason
By Brown, Jackson, Boettcher & Dienner
Attys.

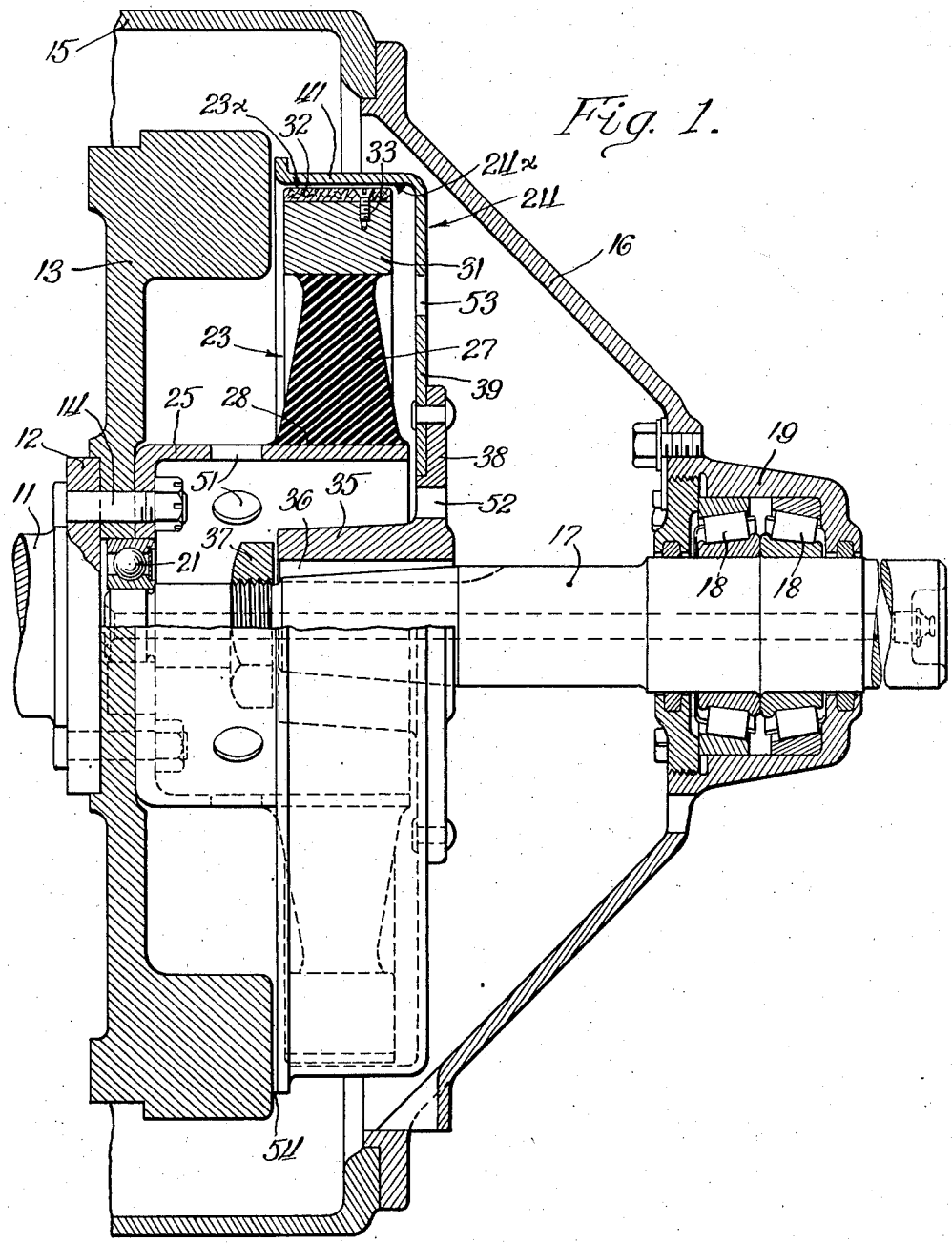

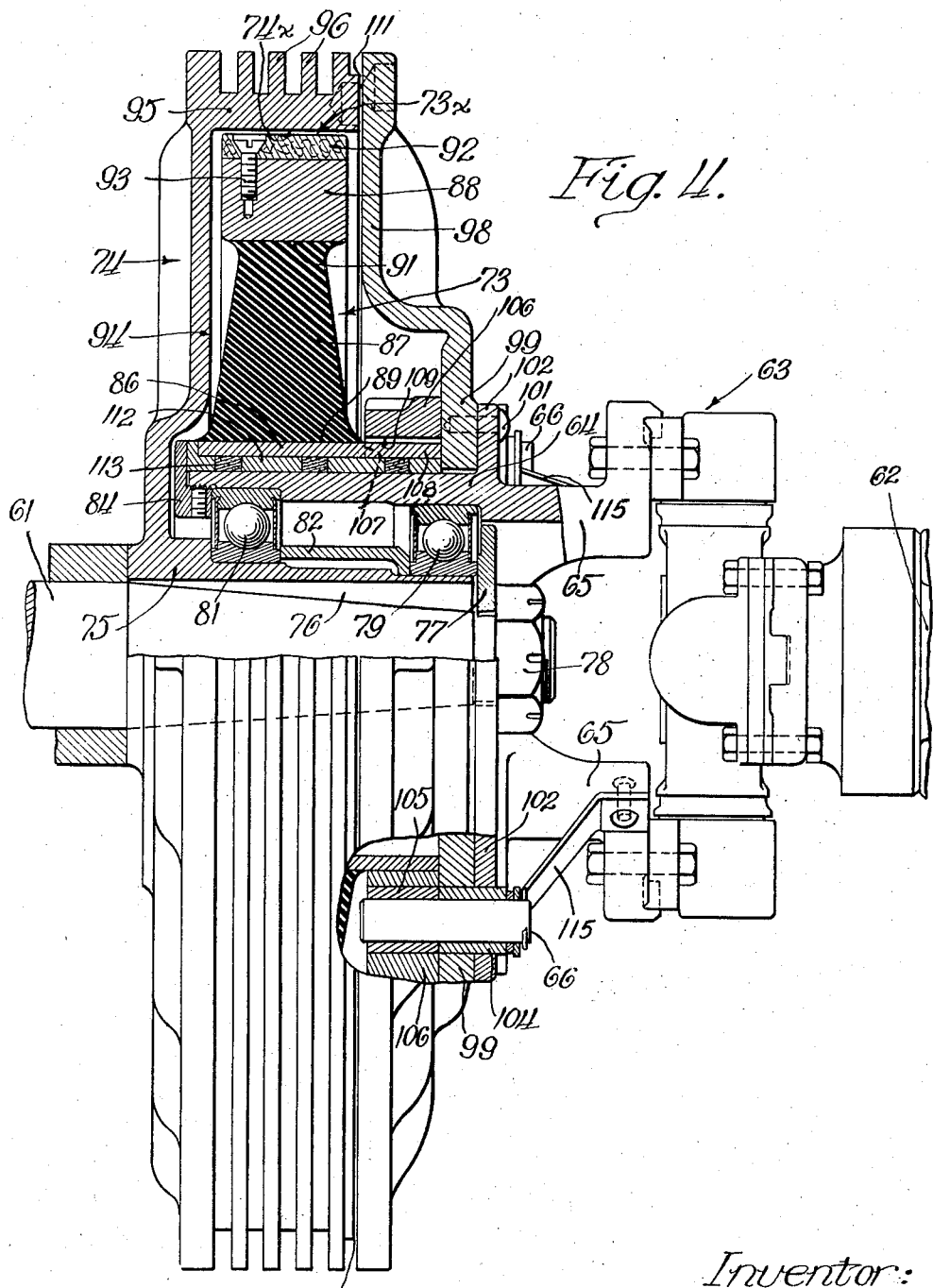

Feb. 1, 1944.    C. M. EASON    2,340,415
CENTRIFUGAL CLUTCH
Filed July 27, 1940    4 Sheets-Sheet 4

Inventor:
Clarence M. Eason
By Brown, Jackson, Boettcher & Dienner
Atty's

Patented Feb. 1, 1944

2,340,415

UNITED STATES PATENT OFFICE 2,340,415

CENTRIFUGAL CLUTCH

Clarence M. Eason, Waukesha, Wis.

Application July 27, 1940, Serial No. 347,842

9 Claims. (Cl. 192—105)

The present invention relates to centrifugal clutches wherein the action of centrifugal force is utilized to effect driving relation between two clutch members, one of which is expansible and the other is fixed as to diametral dimensions. In a clutch of this type the expansible member is the driving element, being disposed within an annulus of fixed diameter forming the driven element. When the driving element is rotated it expands and is held in frictional driving engagement within the driven element solely through the action of centrifugal force.

The expansible driving element of my improved centrifugal clutch comprises a continuous ring of rubber, or rubber-like compound which is bonded between an inner hub and an outer rim consisting of a plurality of metallic segments. These segments, being of appropriate weight, are adapted to move outwardly under the action of centrifugal force when rotated and effect a clutching engagement with the non-expansible driven element. The outer surfaces of these segments are preferably covered with suitable friction lining material attached to the segments.

One object of this invention is to make use of a unitary elastic medium for the dual purpose of retracting the weighted portion of the expansible driving member and to also transmit the entire driving torque, and to form said unitary elastic mass so that all stresses are borne by it in the form of elastic tension. That is to say, in this particular form of clutch, the summation of all forces acting upon the elastic ring result in a pulling or stretching of the material. A further object is to form the elastic member so that these tensional stresses are evenly distributed throughout the mass. A supplementary feature is the forming of the elastic ring so that the area of contact where the rubber is bonded to the hub is approximately equal to the area of the bond between the rubber and the rim segments.

Another object of this invention is to utilize the substantially unstrained state, or free form, of the moulded rubber ring for holding the driving and driven clutching surfaces apart when the clutch is at rest or in the non-driving condition. Also to make use of the clearance thus established to control and to predetermine the rotative speed at which said friction surfaces will make contact and/or establish a driving clutch engagement between driving and driven elements when rotation is imparted to the driving element by means of the prime mover.

Another feature of the invention pertains to utilizing the very considerable range of the modulus of elasticity which is available in rubber, or rubber-like compounds, of different degrees of hardness or physical properties, for controlling the operating characteristics of the clutch.

Another object of the invention is to utilize the hysteresis, or internal molecular friction, of the elastic ring for damping out or absorbing cyclic torque variations and vibrations, and to further make use of the elastic properties of said ring to absorb undue shocks and relieve temporary overloads commonly encountered in such clutch operation.

Another object is to make use of the elastic properties of the drive ring to accommodate a considerable degree of misalignment between the driven and driving members of the clutch; i. e. to combine the functions of a so-called flexible coupling with a clutch and torsional vibration dampener, all in one simple unitary member.

Another feature of this invention is to provide a structure which can readily be manufactured by established commercial moulding and vulcanizing techniques, and which will function in service in a practical and trouble free manner, requiring no manual actuation other than control of the rotative speed of the prime mover.

Other features, objects, and advantages of the invention will appear from the following detailed description of two preferred embodiments of the invention. One embodiment illustrating a typical utility of my invention is in the case of an internal combustion engine transmitting power through a centrifugal clutch to a power take-off shaft for driving any type of load which may be picked up and brought into motion entirely by means of an increase in the speed of the engine. Another embodiment illustrating a further utility of the invention is in the case of railway cars where the rolling motion of the car transmits a drive through the centrifugal clutch to a generator which supplies a lighting system or other electrical system on the railway car, this generator only being set into motion after the railway car has reached a predetermined speed. In the accompanying drawings illustrating these embodiments:

Figure 1 is an axial view, mostly in section, showing my improved centrifugal clutch associated with the flywheel of an internal combustion engine and arranged to drive a power take-off shaft;

Figure 2 is an axial sectional view of the centrifugally expansive clutch element;

Figure 3 is a side elevational view of the centrifugally expansive clutch element, as viewed from the right hand side of Figure 2;

Figure 5:
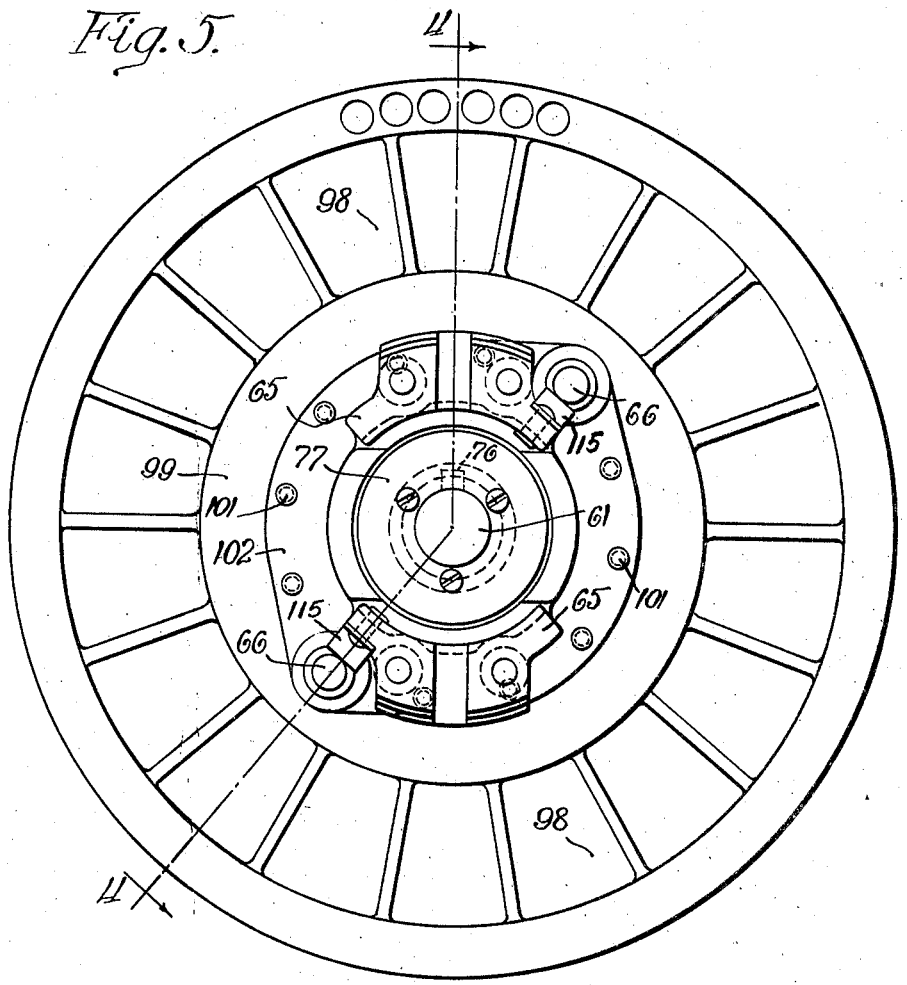

Figure 4 is a side view, partly in elevation, and partly in axial section on the plane of the line 4—4 of Figure 5, showing a modified embodiment for use on railway cars wherein the driven clutch member is mounted directly upon the armature shaft of an electric generator; the expansible driving clutch member being supported upon bearings carried on the hub of the driven member, and in turn being driven through a jointed propeller shaft geared to the car wheel axle; and Figure 5 is an elevational view of the latter embodiment, as viewed from the right hand side of Figure 4.

Referring to Figure 1, the shaft 11 represents the crank shaft or any other suitable driving shaft of an internal combustion engine or other source of power, this driving shaft 11 being formed with an end flange 12 to which a flywheel 13 is secured by the bolts 14. This flywheel is enclosed within a suitable flywheel housing 15, from which an outer conical housing section 16 extends. The power take-off shaft 17 has its main bearing support in roller bearings 18, 18 carried within the bearing hub 19 of housing section 16. The front end of power take-off shaft 17 has pilot bearing support in an anti-friction ball bearing 21 which is interposed between a reduced front end of the shaft 17 and a bearing bore formed in the web of the flywheel 13. The generator or other load to be driven has coupled connection with the outer end of the take-off shaft 17 through the medium of belting, gearing, or other form of transmission means.

The driving element of the clutch, designated 23 in its entirety, is carried by the driving shaft 11 and flywheel 13, and the driven element of the clutch, designated 24 in its entirety, is carried by the power take-off shaft 17. The driving clutch element 23 comprises a hub 25 which is preferably constructed in the form of a cup-shaped steel sleeve. The radially extending inner flange of this hub is apertured to receive the bolts 14, which rigidly clamp the hub to the driving flange 12 and flywheel web 13. Vulcanized around the other end of this hub 25 is the aforementioned ring 27 composed of elastic rubber composition. An extremely durable vulcanized bonding is obtained between the rubber and the metal by first plating the surface of the metal over the entire bonding area with a brass plating, as indicated at 28, and thereafter vulcanizing the rubber composition to this brass plating. Vulcanized around the outer periphery of the expansible rubber ring 27 are the aforementioned centrifugal segments 31. As shown in Figure 3, this expansible rim portion 31 of the driving clutch element preferably comprises a substantial number of segments, Figure 3 illustrating six segments, all of substantially the same size and shape. Secured to the outer surfaces of these segments 31 are strips of clutch lining material 32, this fabric preferably being composed of an impregnated or treated fabric composition having a high coefficient of friction, similar to a brake lining material. To facilitate replacing these strips of clutch lining material after wear, they are preferably removably secured to the segments 31 by screws 33 (Figure 1).

Referring now to the driven clutch element 24, this comprises a hub 35 which is secured by a key 36 and nut 37 to the take-off shaft 17. Projecting from this hub is a radial flange 38 to which is riveted the web portion 39 of an annulus or rim 41 which surrounds the rim 31 of the driving clutch element. The inner surface of said annulus 41 defines a substantially cylindrical internal clutch surface 24x for cooperation with the substantially cylindrical external clutch surface 23x of the driving clutch element. The radial spacing between these clutching surfaces 23x and 24x, when the engine is running at an idling speed or is at rest, is proportioned so that the surfaces will be brought into contact by centrifugal force, acting against the initial elastic tension of the rubber ring, at the particular speed required to meet the operating conditions of the apparatus being driven from the power-take-off shaft.

It is obvious that a weighted, segmental rim section when rotated has a definite axial force acting upon it proportional to the square of the speed, weight of rim and radius of gyration; i. e., centrifugal force, and that this force is resisted by the elastic tension of the supporting or attaching rubber ring, and that therefore if the clearance between clutching surfaces is made small the initial contact will occur at a lower speed than if the clearance is made greater. It is also obvious that a soft rubber, having a low modulus of elasticity, will yield more under less load and therefore effect earlier, or lower speed, engagement than a harder rubber. Also the height of the column of rubber connecting the hub and the rim can be varied to provide different characteristics of clutch action. It is therefore possible to make clutches of this type to meet almost any possible set of operating conditions, and to function without manual control other than as to the speed of the engine or prime mover.

Referring now in detail to the method of making the expansible clutch element 23, the segmental rim 31 is originally in the form of a continuous steel ring of the same cross-sectional form as the final segments (Figure 2). To facilitate the bonding of the rubber to this ring, the inner surface of the ring is first given a brass plating 43, substantially similar to the brass plating 28 on the hub 25. While this rim structure 31 is still in the form of a continuous unit, it is placed in a suitable mould together with hub 25 and a suitable amount of plastic rubber compound to form the body of the rubber ring, which rubber ring is then moulded under pressure and vulcanized by applied heat to the required shape and at the same time the rubber, or rubber-like compound, is firmly bonded to both the outer surface of the hub and to the inner surface of the rim. The rubber composition may be of any desired constituents and proportions, adequate to give the desired elasticity, torque transmitting ability, and other characteristics necessary to meet the requirements of the particular clutch installation. I have found that rubber with a durometer rating of 60 gives satisfactory results, even in relatively heavy duty clutches, and that the mixture can be modified quite widely to meet the speed and load requirements, etc. It is also possible to use synthetic materials, such as "Duprene" or similar rubber-like compounds instead of natural rubber for moulding the elastic ring and bonding the hub and segmented rim into an expandible driving clutch element.

After the vulcanizing operation which unites the hub 25, elastic ring 27 and rim 31 into a unitary member, the lining 32 is attached by means of removable screws 33. The above complete sub-assembly then has an outside diameter approximately the same as the inside diameter of the driven member, surface 23x corresponding in essential dimensions to surface 24x, the exact relative diameters being modified as may be required to provide the desired operating characteristics of the completed clutch.

Due to the fact that the vulcanizing and moulding operation requires the application of heat to the plastic rubber compound to impart to it desirable physical properties, there is set up in the body of the rubber ring an elastic tension or stress which, upon cooling, tends to draw the outer rim in toward the hub but cannot do so as long as the outer rim 31 remains in a continuous ring. However, when this rim and lining are cut into segments by sawing radial, equally spaced slots as indicated at points 45, 45, etc., of Figure 3, then the internal tensional stress is substantially relieved and the separated segments are drawn in toward the hub and the effective outside diameter of the complete assembly becomes smaller than it was before sawing said slots. It has been found that for most commercial clutch applications this shrinkage is just enough to establish the desired amount of clearance between the driving and driven clutch member surfaces 23x and 24x so as to hold said surfaces out of contact until the prime mover has reached the speed at which it is desirable to have the clutch engage. The stress relieved, or free position of the segments is indicated by the inclusion of a sectioned portion of the driven member 24 at the right hand side of Figure 3, the clearance between the right hand segment and this portion of the driven member being schematically distorted or exaggerated for the sake of illustration. Actually this clearance amounts to approximately .001" per 1" of clutch diameter for most clutch applications. For conditions requiring a high speed cut-in, or clutch engaging, point, the clearance is made greater by making the initial diameter of the driving clutch smaller, and, conversely, for conditions which require an early or low speed cut-in point the clearance is made less by making the driving clutch larger than is required for normal operating conditions.

Cooling of the clutch surfaces and of the rubber ring is effected by circulating cooling currents of air outwardly across the inner and outer sides of the driving clutch element 23. Apertures 51 in the hub shell 25, and apertures 52 and 53 in the flange 38 and web 39, serve to admit currents of air for outward flow along opposite sides of the driving clutch element. A narrow annular space 54 defined between the flywheel 13 and the driven clutch annulus 41 functions in the manner of a centrifugal runner for centrifugally impelling air in an outward direction, thereby inducing the cooling flow of air outwardly along the sides of the driving clutch element and laterally across the outside of the driving clutch surface.

Referring now to Figures 4 and 5 which illustrate the embodiment adapted particularly for railway car use where a drive is transmitted from the wheels of the car through the centrifugal clutch to the generator which charges the batteries and lights the lights of the car, the shaft 61 represents the driven device in this arrangement, such as the armature shaft of the generator. The driving train of parts leading from one of the car axles is represented by the driving shaft 62 which has operative connection through the universal joint coupling 63 with a driving sleeve 64. The universal joint 63 may be of any preferred type, the form shown having bolted attachment to diametrically opposite arms 65 extending from the driving sleeve 64. The driving torque is transmitted from the driving sleeve 64 to the driving clutch element 73 through a pair of diametrically opposite shear pins 66, 66, which will be presently described. The driven clutch element 74 comprises a hub 75 which is secured by a key 76, collar 77 and nut 78 on the tapered end of the driven shaft 61. The driving sleeve 64 has rotatable bearing support on the driven hub 75 through the medium of the two ball bearing assemblies 79 and 81, the inner races of these two bearings being held in spaced relation by an annular spacer 82. The outer side of the inner race of bearing 79 abuts against collar 77, and the opposite side of outer race of bearing 81 abuts against a threaded shoulder ring 84 which screws into the end of the driving sleeve 64. The driving clutch element 73 comprises the steel sleeve 86, rubber ring 87 and segmental portion 88. The sleeve 86 is provided with the brass plated end portion 89, to which the rubber composition 87 is vulcanized, and the interior surface of the segmental portion 88 is similarly brass plated, as indicated at 91, and to which plated area the outer peripheral portion of the rubber ring is vulcanized. The clutch lining material 92 is secured to the centrifugal segments 88 by the screws 93, substantially the same as described of the preceding embodiment.

The driven clutch element 74 comprises the end flange or web 94 which extends radially outwardly from the inner end of the driven hub member 75. A cylindrical flange or annulus 95 projects laterally from the outer periphery of the web 94, the cylindrical interior of this annulus defining the driven clutch surface 74x, adapted to be engaged by the driving clutch surface 73x. Annular cooling flanges 96 radiate from the outer periphery of the annulus 95. The opposite or front side of the clutch assembly is closed by a cover plate 98 which rotates with the driving hub 64. The inner peripheral portion 99 of this cover plate is secured by rivets or screws 101 to a radial flange 102 projecting from the driving hub 64.

Where, for reasons of safety, it is desired to have the drive transmitted through shear pins which will break in the event of extreme overload, it is preferable to interpose these shear pins at that point of the drive occurring between the driving hub 64 and the driving clutch element 73. In providing for these shear pins, bushings 104 are extended through aligned apertures in the cover plate portion 99 and flange 102, there being two of these bushings at diametrically opposite points in the assembly. Disposed inside the cover plate 98 is a drive ring 106 which carries two diametrically opposite bushings 105 which are adapted to match, end to end, with the bushings 104. The shear pins 66 pass through these aligned bushings 104 and 105. At angularly spaced points around the front edge of the steel sleeve 86 are cut relatively large square tooth notches 107 which leave tooth-shaped driving projections 108 extending forwardly for engagement within correspondingly shaped sockets 109 formed in the bore of the driving ring 106. Thus, a rigid driving relation is maintained between the driving ring 106 and the steel sleeve 86. The latter sleeve 86 is so mounted on the driving hub 64 that said hub is capable of rotating freely within the sleeve 86 after the pins 66 have been sheared by overload. In order to remove all possibility of binding occurring between the driving rub 64 and sleeve 86, which might tend to compel concurrent rotation of the driving clutch element after failure of the shear pins, I preferably interpose a free running bushing 112 between the hub and sleeve, and capable of rotating with respect to each. This bushing may be provided with a multiplicity of circular holes 113 which are packed with graphite or other suitable lubricant so as to prevent the possibility of the steel sleeve 86 seizing to the driving hub 64 following shear pin failure. Very thorough precautions must be adopted in present day high speed train installations, where the high speed may cause an armature failure with resultant locking of the shaft 61 and driven clutch element 74. In such event, it is imperative that the destructiive torque be released at a point such that no part of the line of transmission parts break and drop down on to the road bed. For example, if disruptive failure occurred in the universal joint 63 or in the adjacent end of the shaft 62, one part of the shaft might drop down and jam into the road bed with sufficient strength to derail the car. By having the shear pin relief occur at a point between the driving end of the transmission train and the driving clutch element 73, the abnormal driving torque is released immediately from the driving clutch element so that high rotative speed is no longer transmitted thereto. The drop-off in speed of the driving clutch element immediately contracts this clutch element and separates the clutch engaging surfaces. The shear pins 66 are mounted for quick removal from the bushings 104 and 105, the pins being removably held in place by light clips or leaf springs 115 which have their inner ends riveted to the arms 65 and which have their outer ends bearing against washers or shoulders carried by the shear pins. The release of these spring arms enables the shear pins to be instantly withdrawn from the bushings 104, 105 for replacement of the pins. The cover plate 98 which rotates with the driving clutch element is spaced slightly from the annulus 95 of the driven clutch element, this relation defining an annular space 111 through which an air circulation occurs for cooling purposes, and through which any dirt or other foreign matter is discharged from the clutch space defined within the parts 94, 95 and 98.

The expansible clutch element 73 of this embodiment operates in the same manner described of the expansible clutch element 23 of the preceding embodiment. Furthermore, this expansible clutch element 73 is constructed in the same manner that the preceding clutch element 23 is constructed. In both of the above described embodiments of my invention, the lining material 32 or 92 might be secured to the inner surface of the driven clutch element, if desired.

While it is preferable, from the manufacturing standpoint, to make the rim structure 31 or 88 in the form of a unitary continuous ring, it is possible to make this in the form a separate arcuate segments and assemble a suitable number of the same into the mould before vulcanizing and bonding the hub and rim section to the elastic ring. It is also possible to make both the hub and rim of non-ferrous metal, having the desired bonding characteristics instead of steel which must be brass plated to obtain a strong bond between the metal and the rubber. The rim section may also be made of any non-metallic material having desirable friction characteristics and capable of being bonded to the rubber ring. In both embodiments, the symmetrically tapered cross-section of the rubber composition results in the rubber web having an area of bonded attachment to the hub substantially equal in extent to the area of bonded attachment to the peripheral segments, which is desirable. In computing the area of bonded attachment to the peripheral segment, consideration must be given to the reduction of area resulting from the radical slots 45. The wide base of the tapered cross-section also minimizes any axial vibration or shifting of the peripheral segments. For very small clutches used on lightly loaded drives it is possible to utilize the expansive properties and friction characteristics of the rubber ring alone, without the metallic or other rim structure.

While I have illustrated and described what I regard to be the preferred embodiments of my invention nevertheless it will be understood that such are merely exemplary and that numerous modifications and rearrangements may be made therein without departing from the essence of the invention.

I claim:

1. A clutch comprising a driving member, a drivable member, means forming a cylindrical surface extending axially from the driving member, a one-piece annular expansible body of rubber composition having its inner peripheral surface bonded to said cylindrical surface and extending radially outwardly from said cylindrical surface with both side faces of said annular body free to expand substantially equal amounts, a plurality of relatively heavy metallic segments bonded to the rubber composition, a facing supported by each of the segments, means forming a cylindrical surface extending axially from the drivable member and adapted to restrain the radially outward movement of the facing, said expansible body of rubber composition in its substantially unstrained state being adapted to maintain said facing out of contact engagement with the cylindrical member extending from the drivable member.

2. A method of forming a clutch including a driving member and a driven member, comprising vulcanizing and bonding an annular body of rubber composition between the driving member and an outer sleeve, reducing the diameter of the sleeve and releasing tension strains in the rubber composition by forming slots in the sleeve to provide a plurality of circumferentially extending segments, and limiting the radially outward movement of the segments to a diameter substantially equal to the original diameter of the sleeve.

3. A clutch comprising a driving member, a drivable member, and means forming an engageable connection therebetween, said connection comprising a body of rubber composition attached to the driving member and extending radially outward, a plurality of segments attached to the rubber composition, said segments being originally in the form of a continuous sleeve to which said body of rubber composition is vulcanized, the subsequent cooling of the rubber composition and cutting of the sleeve into segments resulting in said segments forming a circumference less than the circumference corresponding to their radii, and limiting means attached to the drivable member for restraining the segments from moving radially outward beyond a circumference corresponding to their radii.

4. In a clutch of the class described, the combination of a driving member, a driven member, an expansible body of rubber composition bonded to said driving member and extending radially outwardly, a plurality of relatively heavy segments bonded to said expansible body, said segments being originally in the form of a continuous ring to which said expansible body of rubber composition is bonded by heating, the subsequent cooling of the rubber composition and cutting of the ring into segments resulting in said segments forming a circumference less than the circumference corresponding to their radii, the area of bonding between said driving member and said expansible body being substantially the same as the area of bonding between said segments and said expansible body, and a drum carried by said driven member into which said segments expand for establishing a frictional clutching engagement when said driving member is brought up substantially to a predetermined speed.

5. In a clutch of the class described, the combination of a driving member comprising a central hub, a plurality of arcuate segments having external cylindrical surfaces defining an expansible periphery for said driving member, a web of rubber composition having its inner portion vulcanized to said central hub and having its outer portion vulcanized to said arcuate segments, said arcuate segments being originally in the form of a continuous sleeve to which said web of rubber composition is vulcanized, the subsequent cooling of the web of rubber composition and cutting of the sleeve into segments resulting in said segments being drawn inwardly whereby they form a circumference less than the circumference corresponding to their radii, said web tapering in cross-section from a relatively wide hub portion to a relatively narrow peripheral portion, said web constituting the sole connecting medium between said central hub and said peripheral segments and permitting said segments to move outwardly under centrifugal force when said driving member is brought up to a predetermined speed, and a driven member having an internal cylindrical surface against which the external cylindrical surfaces of said segments engage in high torque transmitting contact at said predetermined speed, the external cylindrical surfaces of said arcuate segments being of the same radius as the internal cylindrical surfaces of said driven member.

6. The method of constructing a centrifugally responsive friction clutch of the class described wherein the driving member includes a hub portion, an expansible peripheral portion, and a body of rubber composition joining said portions, which method comprises vulcanizing and moulding an annular body of rubber composition between the hub portion and peripheral portion, the heat incident to said vulcanizing and moulding operation establishing an elastic tension or stress in said body of rubber composition, which, upon cooling, tends to draw said peripheral portion inwardly toward said hub portion, and then cutting said peripheral portion into a plurality of segments which are thus free to be contracted inwardly from the original diameter of said peripheral portion by said elastic tension.

7. In a power take-off clutch of the class described, the combination of a flywheel constituting a driving element, a shaft constituting a driven element, a hub secured to said flywheel, an annular web of rubber composition vulcanized to said hub beyond the plane of said flywheel, a plurality of relatively heavy metallic arcuate segments vulcanized to the periphery of said web, a drum carried by said shaft disposed alongside said flywheel and surrounding said arcuate segments, said segments moving outwardly into frictional driving engagement with said drum by centrifugal expansion of said rubber composition web, and an annular air discharging opening defined between said flywheel and said drum for inducing a flow of air past the clutch surfaces.

8. In a clutch of the class described, the combination of a driving member, a driven member, an expansible body of rubber composition bonded to said driving member, a plurality of relatively heavy metallic segments bonded to said expansible body, a drum carried by said driven member into which said segments expand for establishing a frictional clutching engagement when said driving member is brought substantially up to a predetermined speed, and overload release means comprising a shear pin carried by one of said members adapted to shear upon predetermined torque for preventing overload torque from acting destructively on said expansible body of rubber composition.

9. In a generator drive clutch for railway cars, the combination of a driving shaft rotated from the wheels of the railway car, a driven shaft connected with the generator, a hub rotated by said driving shaft, a sleeve mounted on said hub so as to be capable of rotation relatively thereto, an overload shear pin normally transmitting driving torque from said hub to said sleeve but adapted to shear and interrupt said driving relation upon the transmission of a predetermined overload torque, a web of rubber composition bonded to said sleeve and extending outwardly therefrom, a plurality of relatively heavy metallic arcuate segments bonded to the outer periphery of said web, and a drum carried by said driven shaft surrounding said segments, said web of rubber composition permitting said segments to move outwardly and establish a frictional clutching engagement with said drum when said driving shaft comes up to a predetermined speed.

CLARENCE M. EASON.